Nov. 22, 1960     C. G. TAYLOR     2,961,188
LIFT-PROPULSION DEVICE FOR AIRCRAFT Filed May 2, 1956     4 Sheets-Sheet 1

INVENTOR.
Clarence Gilbert Taylor
BY
Frease & Bishop
ATTORNEYS

Nov. 22, 1960 — C. G. TAYLOR — 2,961,188
LIFT-PROPULSION DEVICE FOR AIRCRAFT
Filed May 2, 1956 — 4 Sheets-Sheet 2

INVENTOR.
Clarence Gilbert Taylor
BY
Frease & Bishop
ATTORNEYS

Nov. 22, 1960    C. G. TAYLOR    2,961,188
LIFT-PROPULSION DEVICE FOR AIRCRAFT
Filed May 2, 1956    4 Sheets-Sheet 3

INVENTOR.
Clarence Gilbert Taylor
BY
Frease & Bishop
ATTORNEYS

Nov. 22, 1960     C. G. TAYLOR     2,961,188
LIFT-PROPULSION DEVICE FOR AIRCRAFT Filed May 2, 1956     4 Sheets-Sheet 4

INVENTOR.
Clarence Gilbert Taylor
BY
Frease & Bishop
ATTORNEYS

United States Patent Office 2,961,188
Patented Nov. 22, 1960

2,961,188
LIFT-PROPULSION DEVICE FOR AIRCRAFT

Clarence Gilbert Taylor, near Alliance, Ohio, assignor of one-half to Josephine M. Taylor, and one-half to Products Design, Inc., a corporation of Ohio, both of Alliance, Ohio Filed May 2, 1956, Ser. No. 582,231

16 Claims. (Cl. 244—12)

My invention relates to improvements in lift-propulsion devices for aircraft and more specifically to a lift-propulsion device incorporating generally U-shaped channel wing sections in combination with generally laterally placed wings. Further, the present invention constitutes improvements on my adjustable lift-propulsion device for aircraft described and claimed in my prior U.S. Patent No. 2,693,920, dated November 9, 1954.

Many prior aircraft constructions have included one or more standard laterally placed wings with means on the aircraft for propelling it forward and causing a flow of air over the air foil surfaces of said wings. One of the principal difficulties with most prior extra-lift propulsion devices for aircraft is that the top speed to landing ratio of aircraft incorporating such devices is relatively low, in the order of 3 to 1, whereas, particularly in recent years, it has become extremely desirous to provide an aircraft which will have a relatively high top speed but yet an extremely low landing speed, so that the space required to take-off or land the aircraft may be relatively short.

Certain improvements have been made by combining the propulsion means with a lift device for aircraft, one of which is described and claimed in my above prior U.S. Patent No. 2,693,920. In that case, rather than providing a standard generally laterally placed wing, generally U-shaped air foil sections, termed channel wing sections, are provided, with means for inducing a flow of air over the channel wing sections, and with the channel wing sections being mounted on the fuselage of the aircraft for angular movement in a variation of directions in reference to said fuselage.

Although this channel wing construction disclosed in the above patent provides certain advantages as set forth in said patent, it still does not completely solve the problem of satisfying the want for aircraft having higher top speed to landing speed ratios. This channel wing construction does, however, increase these ratios, particularly when a multiplicity of these channel wing sections are provided spaced laterally along the lateral length of standard laterally placed wings, such multiple construction also being disclosed in my prior Patent No. 2,693,920.

In this multiple channel wing section construction, disclosed in my above prior patent, each of the channel wing sections is mounted as a separate operating unit attached to the fuselage or wings. Thus, in each case, the channel wing sections and the standard laterally placed wings are operating as independent lift units, with the channel wings providing auxiliary lift for the aircraft, and by increasing the angle of incidence of the channel wing sections and propelling means, greater lift at low speeds is provided.

Further, although the channel wing sections and the standard laterally placed wings are operating as separate units, the channel wing sections to a certain extent aid the laterally placed wings in that the air flow means of the channel wing sections assist the air flow over the laterally placed wings. Although this multiple channel wing section construction provides greater lift at lower speeds for the aircraft incorporating the same, it still does not provide the high top speed to landing speed ratios desired for modern aircraft, since the top speeds of such aircraft have been steadily increasing, thereby demanding higher landing speeds and consequently longer airport runways.

It is therefore a general object of the present invention to provide a lift-propulsion device for aircraft which overcomes the above stated and other disadvantages and difficulties of the prior constructions.

It is a primary object of the present invention to provide an improved lift-propulsion device for aircraft incorporating one or more channel wing sections in combination with at least one generally laterally placed wing.

It is a further object of the present invention to provide a lift-propulsion device for aircraft incorporating one or more channel wing sections in combination with at least one generally laterally placed wing in which the lower portions of the channel wing sections form a part of the generally laterally placed wing airfoil section.

It is still a further object of the present invention to provide a lift-propulsion device for aircraft incorporating a single channel wing section in combination with and mounted centrally of a single generally laterally placed wing in which the center of pressure of the channel wing section is in lateral alignment with or spaced longitudinally forward of the center of pressure of the generally laterally placed wing.

It is another object of the present invention to provide a lift-propulsion device for aircraft incorporating one or more channel wing sections in combination with at least one generally laterally placed wing in which the means for drawing an airstream over the surfaces of each of the channel wing sections and the generally laterally placed wing are mounted stationary within the lateral confines of the channel wing sections.

It is still another object of the present invention to provide a lift-propulsion device for aircraft in which the channel wing sections form a portion of the generally laterally placed wings and in which the channel wing sections, including the air-flow and propelling means, are hingedly connected to the generally laterally placed wings.

It is an additional object of the present invention to provide a lift-propulsion device for aircraft in which the channel wing sections form a portion of the generally laterally placed wings and in which the channel wing sections, including the air-flow and propelling means, are hingedly connected to the generally laterally placed wings in such a manner that, upon the channel wing sections along with portions of the generally laterally placed wings being tilted downwardly at an angle to their normal longitudinal axis, slotted wing sections are formed between the composite channel wing sections and the forward section of the generally laterally placed wings.

It is also an object of the present invention to provide a lift-propulsion device for aircraft in which the channel wing sections form a portion of the generally laterally placed wings and blend smoothly into said generally laterally placed wings.

Finally, it is an object of the present invention to provide a lift-propulsion device for aircraft which satisfies all of the above objects yet is relatively simple in construction and may be fabricated at a minimum of material and labor cost.

These and other objects are accomplished by the parts, constructions, arrangements, combinations and subcombinations comprising the present invention, the nature of which is set forth in the following general statement, preferred embodiments of which—illustrative of the best mode in which applicant has contemplated applying the principles—are set forth in the following description and illustrated in the accompanying drawings, and which are particularly and distinctly pointed out and set forth in the appended claims forming a part hereof.

The lift-propulsion device for aircraft comprising the present invention may be stated generally as including the combination of at least one generally U-shaped channel wing section and at least one generally laterally placed wing, with means for drawing a stream of air over the airfoil surfaces of both of said wings. Further, the air-flow and propelling means is mounted within the lateral confines of the channel wing section and in fixed relation thereto.

Still further, the channel wing section is mounted on the generally laterally placed wing so that the lower portion thereof forms a part of the airfoil section of said laterally placed wing. It is also preferred that the channel wing section be formed as a portion of and so that it blends smoothly into the generally laterally placed wing.

The channel wing section may be fixed in relation to the generally laterally placed wing but it is preferred that it be hingedly connected thereto, along with its air-flow and propelling means, for movement at an angle to its normal longitudinal axis. Such hinged connection may be of numerous constructions.

The channel wing section may be hingedly connected to and form a portion of the generally laterally placed wing by being mounted as a portion of a hinged flap on the generally laterally placed wing or by being integral with and extending into and within the confines of the flap. Further, the composite flap may be hinged to the generally laterally placed wing at the top or bottom surface of the wing providing an unbroken wing surface along the hinging section when the composite channel wing section is angled from its normal longitudinal axis.

Still further, the flap may be hinged substantially midway between the top and bottom surfaces of the generally laterally placed wing providing smooth wing surfaces even though the composite channel wing section is angled to its normal longitudinal axis. Also, the flap may be hinged with hinge point aft of the forward edge of the composite flap to provide a slotted wing construction forward of the composite channel wing section when the composite channel wing section is angled to its normal longitudinal axis.

Additionally, types of channel wing sections may be constructed so that these sections are only formed into generally U-shaped sections at certain times during the flight of an aircraft when the high lift features of the channel wing sections are desired, that is, usually during take-off and landing of the aircraft. With this construction, at other times during the flight of the aircraft, the channel wing section folds down to form a part of a laterally placed wing.

In this construction the portions of the channel wing section which normally extend generally vertically may be selectively folded downwardly to form a portion of the trailing edge of the laterally placed wing upon which the channel wing section is mounted, so that this channel wing section assumes the position of the normal flap on the aircraft. During periods of the flight of the aircraft when high lift is desired, the sides of the channel wing section may be selectively folded upwardly from the laterally placed wing to assume their normal generally vertically extending positions, and at this time the channel wing section provides a similar construction and operates similarly to the other channel wing sections according to the principles of the present invention, that is, it may be selectively tilted downwardly at an angle to its normal longitudinal axis along with its air-flow and propelling means.

Still another form of channel wing section incorporating certain of the principles of the present invention may be formed with the generally vertically extending sides of the channel wing section fixedly secured to and stationary on the laterally placed wing. In this construction the only portion of the channel wing section which could be selectively tilted downwardly, at an angle to the normal longitudinal axis of the channel wing section, would be the part of said section which normally extends in a generally horizontal plane, with the stationary generally vertically extending sides of the section projecting downwardly a sufficient distance so that the sides of this horizontally extending portion of the section are at all times abutted by the generally vertically extending sides.

Finally, a single channel wing section may be provided with a single generally laterally placed wing of a tailless aircraft. In such a construction the channnel wing section would be mounted substantially midway of the generally laterally placed wing and the center of pressure of the channel wing section must be in lateral alignment with or spaced forward of the center of pressure of the generally laterally placed wing.

By way of example, embodiments of the improved lift-propulsion device for aircraft comprising the present invention are illustrated in the accompanying drawings forming a part hereof, wherein like numerals indicate similar parts throughout the several views, and in which.

Figure 1:
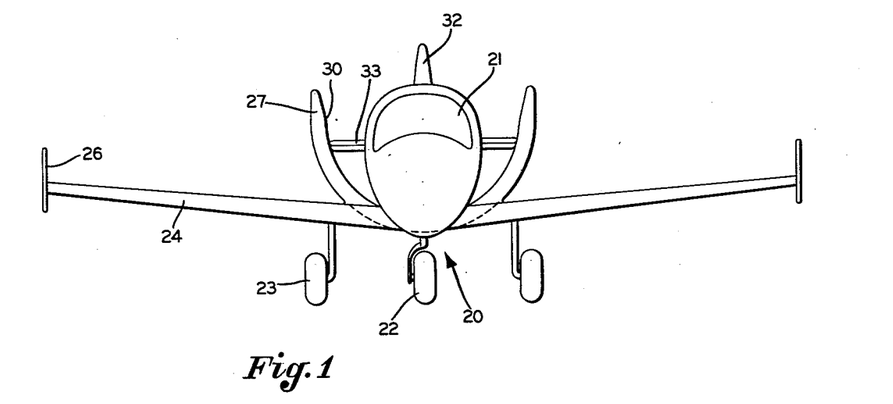
Fig. 1 is a front view of an aircraft incorporating a single channel wing section in combination with a single generally laterally placed wing.
Figure 2:
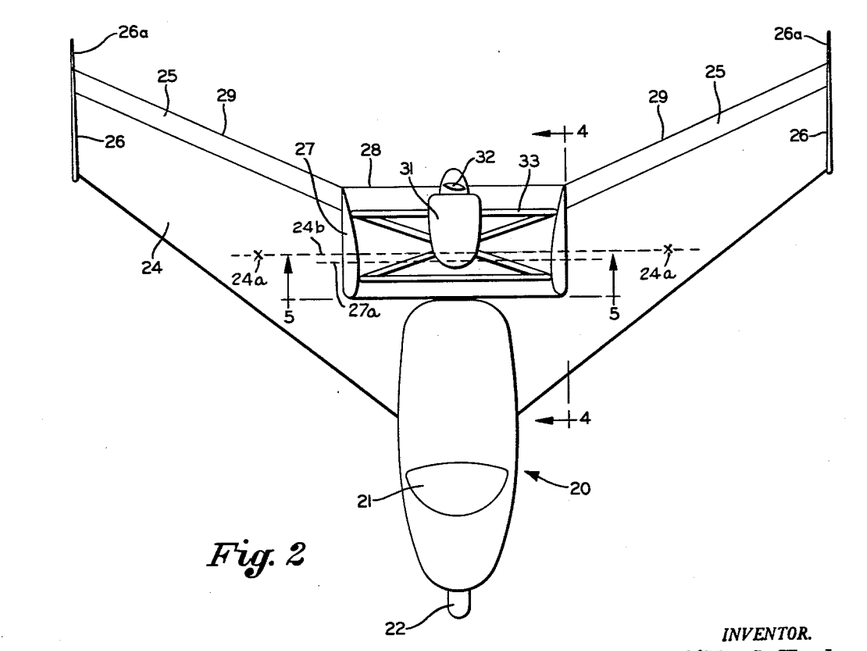
Fig. 2, a top plan view of the aircraft of Fig. 1.
Figure 3:
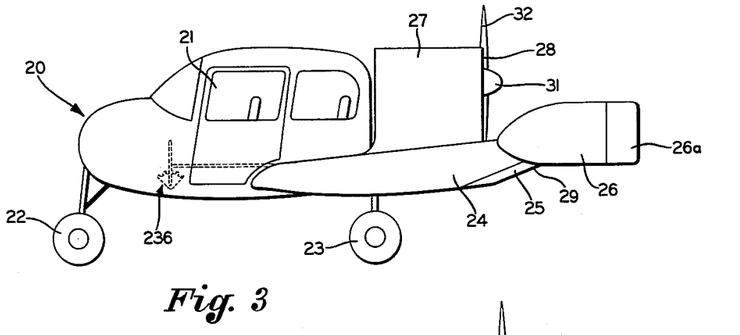
Fig. 3, a side elevation of the aircraft of Fig. 1.

Certain of the principles of the lift-propulsion device for aircraft comprising the present invention are shown incorporated in an aircraft in Figs. 1 through 9. As shown in Figs. 1 through 3, the aircraft includes a tailless fuselage generally indicated at 20 having the usual passenger and pilot compartment 21.

Further, the aircraft includes the usual nose landing wheel 22 and wing landing wheels 23. Still further, a single generally laterally placed wing 24, in this case a swept-back dihedral wing, is attached to and extends partially aft of the fuselage 20, during the combination elevators and ailerons 25 and the wing tip vertical stabilizing members 26 which are provided with rudders 26a.

Finally, a generally U-shaped channel wing section 27 is mounted on the generally laterally placed wing 24, substantially midway of wing 24 and aft of fuselage 20. Both wing 24 and channel wing section 27 are of usual airfoil cross section and channel wing section 27 is preferably mounted on wing 24 so that the trailing edge 28 of section 27 is in substantial alignment with the trailing edge 29 of elevators and ailerons 25, at the particular portion of wing 24 upon which section 27 is mounted.

Further, for the purposes of the present invention, the inner U-shaped opening 30 at the forward portion of channel wing section 27 must not open below the airfoil section of wing 24, that is to say, normally there is an unbroken surface along which air will flow over the top surface of wing 24 and over the top surface of channel wing section 27 within opening 30, and an unbroken underside surface for air to flow beneath wing 24 and beneath the underside of channel wing section 27. Also, for the purposes of the present invention, it is preferred that the channel wing section 27 be designed to blend smoothly into the portion of wing 24 upon which section 27 is mounted, as shown.

Means for drawing a flow of air over the airfoil surfaces of wing 24 and channel wing section 27 is preferably mounted within the inner opening 30 of section 27 and, as shown, in this case includes a usual aircraft engine 31 having the usual propeller 32 mounted thereon. Engine 31 and propeller 32 are mounted on and within channel wing section 27 by any usual means such as the lateral mounting members 33.

The particular means for drawing a flow of air over the surfaces of wing 24 and channel wing section 27, in this case is of the pusher type, which will draw air over the forward section of the generally laterally placed wing and through the channel wing section. It is not intended, however, to limit the principles of the present invention to this particular type of airflow and propelling means, and it should be understood that the advantages of the present invention can be gained by use of other means, such as that which would propel air in a direction aft of the aircraft, or that which does not make use of a propeller for propelling the air flow.

Further, as before stated, it is an important feature of the present invention that the forward edge of the channel wing section 27 does not open below the undersurface of the airfoil section of the generally laterally placed wing 24, that is, so that the inner opening 30 of section 27 does not open at the forward edge thereof beneath the airfoil section of wing 24. Thus, with this construction, not only is the independent lift on each of the wing 24 and channel wing section 27 taken advantage of, but also a certain amount of advantage in lift is gained by having an unbroken flow of air over wing 24 and through channel wing section 27 as well as beneath both wing 24 and section 27. This particular feature of construction becomes even more important and advantageous when the channel wing section 27 is hingedly connected to wing 24 as will be hereinafter described.

Finally, as before stated, it is preferred that the channel wing section 27 be constructed to blend smoothly into the top surface of the generally laterally placed wing 24. In this manner, any increased drag on the aircraft which would normally be caused by the irregular joinder surfaces is greatly diminished.

Another important feature of construction which must be provided when a single channel wing section 27 and a single generally laterally placed wing 24 is used in the particular aircraft shown in Figs. 1 through 3, that is, one not having a tail section to aid in stabilization, is that, in order to provide longitudinal stability to the aircraft, the center of pressure of the channel wing section must be forward of the center of pressure of the generally laterally placed wing. Again, this particular requirement becomes even more important when the channel wing section is hingedly connected to the generally laterally placed wing, as will be also hereinafter described.

In Fig. 2, for illustration purposes, the approximate means aerodynamic center of pressure of each side of the single generally laterally placed wing 24 is indicated at 24a, with a center of pressure reference line 24b being drawn therebetween. Further, in Fig. 2 the approximate line of the aerodynamic center of pressure of the single channel wing section 27 is indicated at 27a. It can be clearly seen, therefore, that the line of center of pressure 27a of the channel wing section 27 is clearly forward of the centers of pressure 24a of the laterally placed wing 24, thereby providing longitudinal stability to the aircraft.

Thus, in the aircraft illustrated in Figs. 1 through 3, extremely high lift is provided at low forward speeds of the aircraft by the combined lift features of the channel wing section 27 and the generally laterally placed wing 24. Further, great lateral stability to the aircraft is provided by the channel wing section 27, since the end portions thereof extend generally vertically, and great longitudinal stability is provided by having the center of pressure of the channel wing section 27 forward of the center of pressure of the generally laterally placed wing 24. The lateral stability of the aircraft is also aided by the vertical stabilizing members 26.

It is pointed out that the requirement for the center of pressure of the channel wing section to be forward of the center of pressure of the laterally placed wing is important only where other means is not provided to supply longitudinal stability to the aircraft, such as the usual tail section of most conventional aircraft. If the conventional tail section is provided, then this particular positioning of the centers of pressure discussed above would probably not be required, depending on the overall design of the aircraft.

Still further if the aircraft shown in Figs. 1 through 3 were to be provided with several channel wing sections for instance, one at either side of the laterally placed wing 24, the requirement for the centers of pressure stated above would still be necessary because again of the fact that the particular aircraft shown is not provided with a tail section. Normally, however, an aircraft having more than one channel wing section would probably be provided with some form of tail section in order to provide longitudinal stability so that the requirement that the channel wing section centers of pressure forward of the laterally placed wing centers of pressure would not be necessary.

Figure 4:
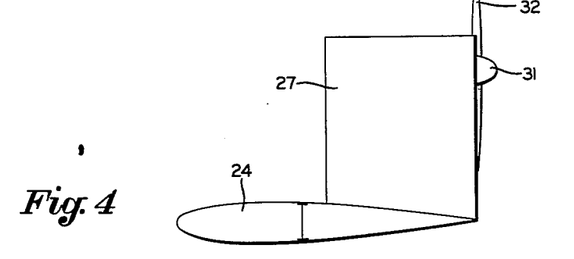
Fig. 4, a somewhat diagrammatic fragmentary sectional view looking in the direction of the arrows 4—4 in Fig. 2.

As illustrated somewhat diagrammatically in Fig. 4, the channel wing section 27 may be mounted stationary on the generally laterally placed wing 24. In this case, the principal advantage gained by the construction is the increased lift at low forward speeds of the aircraft obtained by the combined lift of the channel wing section 27 and generally laterally placed wing 24, as well as the increased lift obtained by the cooperation between these two lift members.

Figure 5:
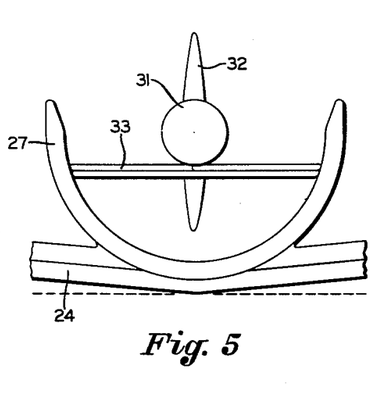
Fig. 5, a somewhat diagrammatic fragmentary sectional view looking in the direction of the arrows 5—5 in Fig. 2.

Also, as shown diagrammatically in Fig. 5, the aircraft illustrated in Figs. 1 through 3 is provided with the channel wing section 27 mounted and smoothly blending into a dihedral generally laterally placed wing 24. In any case, the chord of the channel wing section may be any portion of the chord of the generally laterally placed wing. Further, the channel wing section 27 may be mounted on the top surface of wing 24 but it is preferred that the lower portion of section 27 extend into wing 24, as shown.

Figure 6:
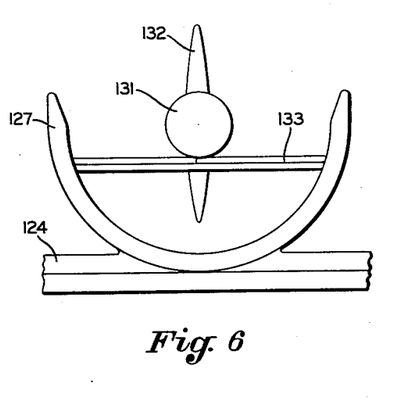
Fig. 6, a view similar to Fig. 5 showing a generally flat laterally placed wing rather than the dihedral laterally placed wing of Fig. 5.

It should be understood that it is not intended to limit the features of the present invention thus far described to dihedral type of generally laterally placed wings 24. For instance, as shown in Fig. 6, a channel wing section 127 may be mounted on a substantially flat wing 124 and be provided with airflow and propelling means such as an engine 131, propeller 132 and mounting members 133. Further, as before stated, air-flow and propelling means other than that shown could be used, if desired.

Figures 7, 8, 10:
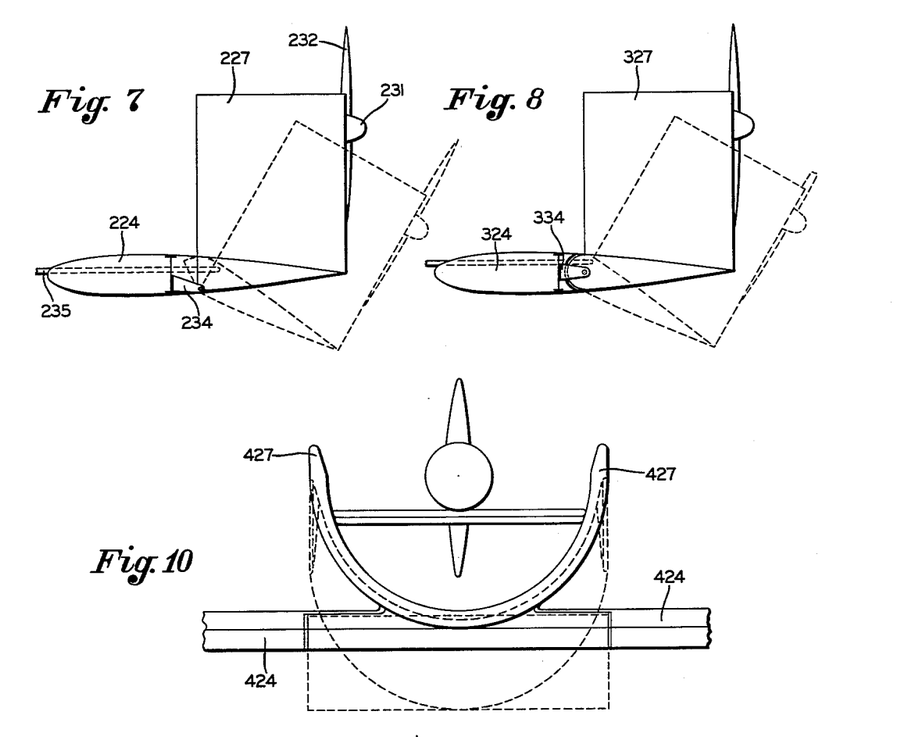
Fig. 7, a view similar to Fig. 4 showing a plain hinged channel wing section.
Fig. 8, a view similar to Fig. 4 showing a center hinged channel wing section.
Fig. 10, a view similar to Fig. 6 showing a generally flat laterally placed wing and a hinged channel wing section.
Figure 9:
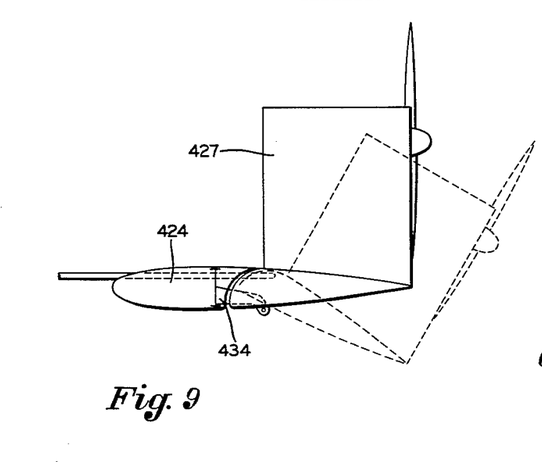
Fig. 9, a view similar to Fig. 4 showing a slotted hinged channel wing section.

Although many advantages are gained by the construction defined in the foregoing, even greater advantages may be provided by hingedly connecting the composite channel wing section to the generally laterally placed wing, some forms of which are illustrated in Figs. 7 through 9. To provide such a construction, the channel wing section may be mounted on the top surface of a hinged flap of the generally laterally placed wing, but it is preferred that the channel wing section be made an integral part of the wing flap, as shown.

In Fig. 7, a channel wing section 227 having the air-flow and propelling means in the form of an engine 231 and a propeller 232 mounted therein, is hingedly connected to a generally laterally placed wing 224 in the manner of a plain hinged flap. That is, section 227 is hinged to wing 224 by means of one or more hinge members 234, which hinge members are mounted adjacent the undersurfaces of wing 224 and section 227.

The hinged movement of section 227 in reference to wing 224 is controlled by any conventional means such as the control rod 235, which would extend into the compartment of the aircraft and be actuated by any usual lever means such as illustrated at 236 by broken lines in Fig. 3. In this manner the channel wing section 227 may be tilted so that it is angled downwardly in reference to its normal longitudinal axis, thereby also angling the air-flow and propelling means to the same extent in reference to its normal longitudinal axis, as illustrated in broken lines in Fig. 7.

When the channel wing section 227 is tilted or angled in this manner, the lift of the combined wing 224 and wing section 227 is greatly increased and this is particularly advantageous for obtaining the much needed increased lift at low forward speeds of the aircraft for landing or take-off of the aircraft. Further, not only does the construction shown in Fig. 7 provide this advantage of greatly increased lift, when the channel wing section 227 is angled downwardly in reference to wing 224, an increased drag on the aircraft is also caused, due to the downward angling of the channel wing, thus aiding in reducing the speed of the aircraft for landing.

In Fig. 8 is shown a channel wing section 327 hingedly connected to a generally laterally extending wing 324 by means of center mounted hinge members 334. Further, the forward portion of section 327 is curved convex and the aft portion of wing 324 is curved concave providing closely abutting edges therebetween, despite any angular position of section 327 in reference to wing 324.

Thus, with the construction shown in Fig. 8, as channel wing section 327 with its air-flow and propelling means is angled downwardly from its normal longitudinal axis, the lift of the aircraft is again greatly increased. The drag on the aircraft is also increased, as in the construction of Fig. 7, again aiding in reducing the speed of the aircraft for landing.

In Figs. 9 and 10 is shown the combination of a generally laterally placed wing 424 and a hingedly connected channel wing section 427 in which section 427 is connected to wing 424 in such a way that a slotted wing construction is provided when section 427 is angled downwardly in reference to its normal longitudinal axis. The hinge members 434 are constructed so that the hinge point between wing 424 and section 427 is beneath section 427 and aft of wing 424. By this manner of hinging, as section 427 is angled downwardly, a slot is opened between section 427 and wing 424.

One advantage of this slotted wing construction is that, as section 427 is angled downwardly with its air-flow and propelling means, the lift of the aircraft is increased an amount considerably greater than with the use of the constructions shown in Figs. 7 and 8. A flow of air is created around section 427, separate from the flow of air around wing 424, and the separate flow of air around section 427 causes an increased flow of air around wing 424 over that normally obtained.

Thus, this slotted composite channel wing section, when angled downwardly along with its air-flow and propelling means, gives the highest possible lift at low speeds by combining the maximum lift of a standard laterally placed wing due to the slot and the tremendous lift of the channel wing section when angled downwardly along with its air-flow and propelling means.

For these reasons, the slotted wing construction shown in Figs. 9 and 10 is the most advantageous of the constructions shown for providing high lift for aircraft at low speeds. Further, with such a constrution incorporated in the construction of the aircraft shown in Figs. 1, 2 and 3, it is possible to provide an aircraft having a top speed of something in the order of 200 miles per hour and a landing speed of under 20 miles per hour, requiring only a bare minimum of length of airport runway.

Figure 11:
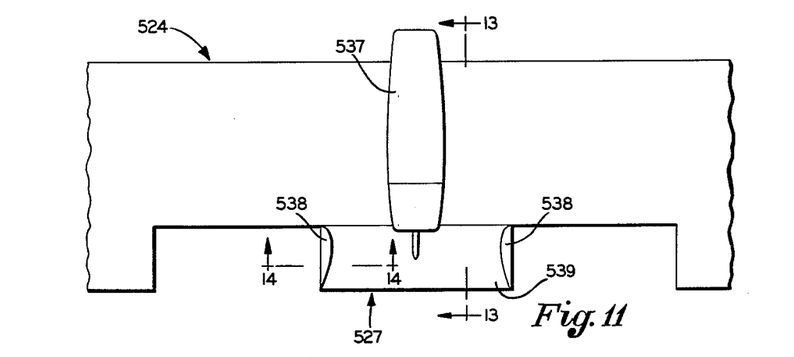
Fig. 11, a fragmentary top plan view showing a generally laterally placed wing section, in combination with a channel wing section formed by folding up a portion of said laterally placed wing.

In Fig. 11 is shown a channel wing section generally indicated at 527 in combination with a generally laterally placed wing, generally indicated at 524. Further, in this case the air-flow and propelling means is in the form of a jet engine 537.

Channel wing section 527 is formed by two normally vertically extending side portions 538 and a normally horizontally extending lower portion 539, with lower portion 539 preferably being hingedly connected to the generally laterally placed wing 524 in any of the methods shown in Figs. 7, 8 and 9 and hereinbefore discussed. Further, side portions 538 of channel wing section 527 are hingedly connected to the lateral extremities of lower portion 539, so that these side portions 538 may be selectively positioned extending generally vertically or positioned extending generally laterally with and forming a part of laterally placed wing 524, the lateral positioning being illustrated in Fig. 14 in broken lines.

Figures 14, 15, 16:
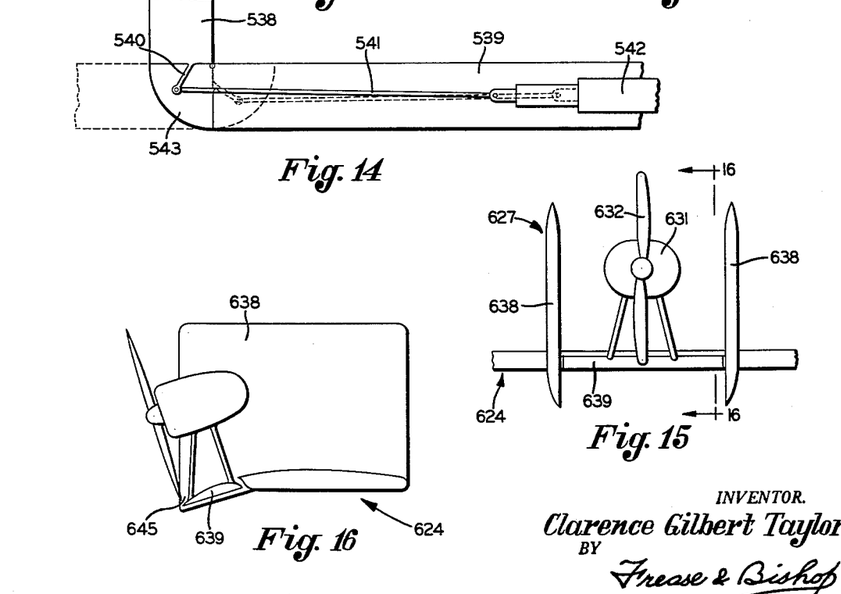
Fig. 14, a somewhat diagrammatic sectional view looking in the direction of the arrows 14—14 in Fig. 11.
Fig. 15, a fragmentary rear view of a generally laterally placed wing section, in combination with a channel wing section formed by mounting two stationary, spaced, generally vertically extending members adjacent the ends of a hinged generally horizontally extending channel wing section lower portion.
Fig. 16, a somewhat diagrammatic sectional view looking in the direction of the arrows 16—16 in Fig. 15, with the hinged lower portion of the channel wing section tilted downwardly in reference to the normal longitudinal axis of said section.

Also, the movement of side portions 538 between their generally vertically extending positions and their generally horizontally extending positions in which they form a part of laterally placed wing 524, may be accomplished in any usual manner. For instance, as shown in Fig. 14, the side portions 538 may be provided with lever arms 540, which lever arms may be pivotally connected to control arms 541, with the control arms being pivotally connected to a usual hydraulic cylinder 542.

Cylinder 542 may be controlled from the passenger compartment of the aircraft, along with the means for tilting the channel wing section downwardly at an angle to its normal longitudinal axis, as hereinbefore described. Thus, the channel wing section 527, although preferably hingedly connected to laterally placed wing 524, is virtually formed by folding up portions of the laterally placed wing.

It is preferred that the lower ends of the side portions 538 of the channel wing section are formed with an arcuate end portion 543, which end portions will hinge telescopically into the lower portions 539 when side portions 538 are pivoted downwardly to generally horizontally extending positions, and which end portions will form smooth arcuate corners on the channel wing section when the side portions 538 are pivoted upwardly to extend generally vertically. It is preferred, for maximum lift at low speed, to hinge the lower portion 539 of the channel wing section to the laterally placed wing 524 in the manner shown in Fig. 9 and hereinabove described, that is, the slotted wing construction, thereby giving the highest possible lift at low speeds for the combined channel wing section and laterally placed wing.

Figures 12, 13:
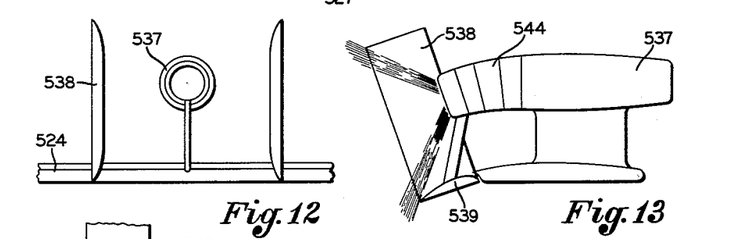
Fig. 12, a fragmentary rear view of the construction of Fig. 11.
Fig. 13, a somewhat diagrammatic sectional view looking in the direction of the arrows 13—13 in Fig. 11, with the channel wing section hinged downwardly in reference to its normal longitudinal axis.

As shown in Fig. 13, it is further preferred that the rear portion of the jet engine 537 is formed with a series of flexibly telescoping rings 544 so that the rearmost of these rings may be connected to the lower portion 539 of the channel wing section. Thus, the jet engine 537 will always produce a flow of air over the trailing edge of the channel wing section 527, thereby producing a flow of air over the airfoil surfaces of the channel wing section as well as laterally placed wing 524, despite the positioning of the channel wing section in reference to the laterally placed wing.

Thus, there is shown in Figs. 11, 12, 13 and 14 a combination channel wing section and generally laterally placed wing in which the channel wing section is formed by virtually folding up a portion of the generally laterally placed wing and may be folded downwardly to merely form a portion of the laterally placed wing. This construction is particularly advantageous in multi-engine aircraft where it may not be desired to provide the channel wing sections during normal flight, but yet these channel wing sections may be formed from within the passenger compartment of the aircraft prior to take-off and prior to landing, thereby providing the maximum possible lift during these critical periods.

A still further form of the combined channel wing section and generally laterally placed wing of the present invention is shown in Figs. 15 and 16. In this form the channel wing section, generally indicated at 627, is formed with side portions 638 mounted stationary on the generally laterally placed wing, generally indicated at 624 and separate from the movable lower portion 639.

Further, the side portions 638 extend generally vertically and are positioned closely adjacent but not connected to the lateral extremities of the lower normally generally horizontally extending portion 639 which is selectively movable. The air-flow and propelling means, in this case an engine 631 and propeller 632, is mounted on the lower portion 639.

Lower portion 639 is again hingedly connected to the laterally placed wing 624, but since the side portions 638 are not connected thereto and are mounted stationary on the laterally placed wing 624, only this lower portion 639 and the air-flow and propelling means may be selectively tilted downwardly in reference to the longitudinal axis of the channel wing section 627. The lower rear portions of side portions 638 are, however, formed with generally triangular extensions 645, so that side portions 638 enclose the lateral extremities of lower portion 639 despite the tilted positioning of lower portion 639.

Finally, side portions 638 may extend completely longitudinally across laterally placed wing 624, if desired, and lower portion 639 may be hingedly connected to wing 624 in any of the manners hereinbefore described. Thus, as shown in Figs. 15 and 16, a simplified form of the combination channel wing section and generally laterally placed wing is provided, which will give high lift to an aircraft at low speeds when the lower portion 639 and the air-flow and propelling means thereof are tilted downwardly in reference to the normal longitudinal axis of the channel wing section.

It should be understood that the principles of the lift-propulsion device for aircraft of the present invention may be incorporated in aircraft of various sizes and shapes and that it is not intended to limit these principles to the particular construction of aircraft shown in Figs. 1, 2 and 3. The channel wing sections may be incorporated in generally laterally placed wings in either aircraft having a single air-propelling means or aircraft having a number of air-propelling means.

Where the single air-flow and propelling means is provided, the channel wing section would be mounted substantially midway of the laterally placed wing, while in the case of numerous air-propelling means, the channel wing sections would be spaced along the lateral length of the wing, placing the air-flow and propelling means in the conventional locations mounted within the channel wing sections. As stated above, it is important, when a single channel wing section having the air-flow and propelling means mounted therein is positioned midway of a laterally placed wing, that the center of pressure of the channel wing section must be forward of the center of pressure of the wing in order that longitudinal stability is provided for the aircraft.

This positioning of the center of pressures of the channel wing section and the generally laterally placed wing becomes extremely important where the single channel wing section is hingedly connected to the wing, as shown in Figs. 7, 8, 9 and 10. If the center of pressure of the channel wing section would be aft of the center of pressure of the generally laterally extending wing, when the composite section is angled downwardly from its normal longitudinal axis along with its air-flow and propelling means, the aircraft would tend to nose over without the addition of strong tail forces, whereas, with the center of pressure of the section forwardly of the center of pressure of the wing, longitudinal stability can be maintained without added tail forces.

Thus, according to the principles of the present invention, a high lift device for aircraft is provided which will obtain a maximum of lift at low forward speeds approaching zero speed, far greater lift than that heretofore possible. For this reason, by incorporating the principles of the present invention in aircraft, it is possible to greatly increase the top speed to landing speed ratio.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of construction shown.

Having now described the invention, the construction, operation and use of preferred embodiments thereof, and the advantageous new and useful results obtained thereby; the new and useful construction and reasonable mechanical equivalents thereof obvious to those skilled in the art are set forth in the appended claims.

I claim:

1. Aerodynamic device construction including fuselage means, a generally laterally placed wing member operably connected to the fuselage means, said laterally placed wing member having an airfoil section, said airfoil section having a lower surface, a generally U-shaped channel wing section pivotally mounted on the laterally placed wing member, said channel wing section having a forward edge and a lower portion and an inner opening formed therein opening upwardly, means pivotally mounting the channel wing section on the laterally placed wing member, the opening in the channel wing section at the location of the channel wing section forward edge normally being free of opening below the laterally placed wing airfoil section lower surface, said means also mounting the channel wing section for selective pivotal movement to a position in which at least said lower portion of the channel wing section is angled downwardly in reference to the laterally placed wing member, control means operably connected to the channel wing section for selectively moving at least said lower portion of the channel wing section, and air flow means operably connected to at least one of said fuselage means and laterally placed wing member and channel wing section for creating a flow of air over said wing member and wing section.

2. The construction as defined in claim 1 in which the lower portion of the channel wing section extends into and blends smoothly into a portion of the airfoil section of the laterally placed wing member; and in which said airfoil section portion is mounted for pivotal movement with at least said lower portion of the channel wing section.

3. The construction as defined in claim 1 in which the laterally placed wing member has a forward edge; in which the means pivotally mounting the channel wing section on the laterally placed wing member mounts said wing section spaced aft of said wing member forward edge and includes hinge means; and in which the hinge means connects said lower portion of the channel wing section to the laterally placed wing member for movement of the channel wing section forward edge away from the laterally placed wing member as the channel wing section is angled downwardly in reference to said wing member forming an open slot forward of the channel wing section and aft of a portion of the laterally placed wing member.

4. The construction as defined in claim 1 in which the air flow means is mounted extending at least partially within the channel wing section inner opening.

5. The construction as defined in claim 1 in which the laterally placed wing member has a forward edge; in which the means pivotally mounting the channel wing section on the laterally placed wing member mounts said wing section spaced aft of said wing member forward edge and includes hinge means; in which the hinge means connects said lower portion of the channel wing section to the laterally placed wing member for movement of the channel wing section forward edge away from the laterally placed wing member as the channel wing section is angled downwardly in reference to said wing member forming an open slot forward of the channel wing section and aft of a portion of the laterally placed wing member; and in which the air flow means is mounted extending at least partially within the channel wing section inner opening.

6. Aerodynamic device construction including fuselage means, a single generally laterally placed wing member operably connected to the fuselage means, said laterally placed wing member having an airfoil section, said airfoil section having a lower surface, a single generally U-shaped channel wing section pivotally mounted on and substantially laterally midway of the laterally placed wing member, said channel wing section having a forward edge and a lower portion and an inner opening formed therein opening upwardly, means pivotally mounting the channel wing section on the laterally placed wing member, the opening in the channel wing section at the location of the channel wing section forward edge normally being free of opening below the laterally placed wing airfoil section lower surface, said means also mounting the channel wing section for selective pivotal movement to a position in which at least said lower portion of the channel wing section is angled downwardly in reference to the laterally placed wing member, control means operably connected to the channel wing section for selectively moving at least said lower portion of said channel wing section, and airflow means operably connected to at least one of said fuselage means and laterally placed wing member and channel wing section for creating a flow of air over said wing and wing section.

7. The construction as defined in claim 6 in which the laterally placed wing member has a forward edge; in which the means pivotally mounting the channel wing section on the laterally placed wing member mounts said wing section spaced aft of said wing member forward edge and includes hinge means; and in which the hinge means connects said lower portion of the channel wing section to the laterally placed wing member for movement of the channel wing section forward edge away from the laterally placed wing member as the channel wing section is angled downwardly in reference to said wing member forming an open slot forward of the channel wing section and aft of a portion of the laterally placed wing member.

8. The construction defined in claim 6 in which the single laterally placed wing member has a center of pressure; in which the single channel wing section has a center of pressure; and in which the single channel wing section is pivotally mounted on the single laterally placed wing member with said wing section center of pressure forward of said wing member center of pressure.

9. The construction defined in claim 8 in which the lower portion of the channel wing section extends into and blends smoothly into a portion of the airfoil section of the laterally placed wing member; and in which said airfoil section portion is mounted for pivotal movement with at least said lower portion of the channel wing section.

10. Aerodynamic device construction including fuselage means, a single generally laterally placed swept-back wing member operably connected to the fuselage means, said laterally placed wing member having an airfoil section, said airfoil section having a lower surface, a single generally U-shaped channel wing section pivotally mounted on and substantially laterally midway of the laterally placed wing member, said channel wing section having a forward edge and a lower portion and an inner opening formed therein opening upwardly, said channel wing section being pivotally mounted on the laterally placed wing member with a portion of the laterally placed wing member extending forward of the channel wing section, means pivotally mounting the channel wing section on the laterally placed wing member, the opening in the channel wing section at the location of the channel wing section forward edge normally being free of opening below the laterally placed wing airfoil section lower surface, said means also mounting the channel wing section for selective pivotal movement to a position in which at least said lower portion of the channel wing section is angled downwardly in reference to the laterally placed wing member, the laterally placed wing member having a center of pressure, the channel wing section having a center of pressure, the channel wing section being pivotally mounted on the laterally placed wing member with said wing section center of pressure forward of said wing member center of pressure, control means operably connected to the channel wing section for selectively moving at least said lower portion of the channel wing section, and air flow means operably connected to at least one of said fuselage means and laterally placed wing and channel wing section for creating a flow of air over said wing member and wing section.

11. Aerodynamic device construction including fuselage means, a generally laterally placed wing member operably connected to the fuselage means, said laterally placed wing member having an airfoil section, said airfoil section having a lower surface, a generally U-shaped channel wing section pivotally mounted on the laterally placed wing member, said channel wing section having a forward edge and an inner opening formed therein opening upwardly, said channel wing section having normally generally vertically extending side portions pivotally connected to a normally generally horizontally extending lower portion, means mounting said wing section side portions for selective pivotal movement between positions extending generally vertically and positions extending generally horizontally and forming a part of the generally laterally placed wing member, means pivotally mounting the channel wing section on the laterally placed wing member, the opening in the channel wing section of the location of the channel wing section forward edge normally being free of opening below the laterally placed wing airfoil section lower surface, said means pivotally mounting the channel wing section also mounting said channel wing section for selective pivotal movement to a position in which at least said lower portion of the channel wing section is angled downwardly in reference to the laterally placed wing member, control means operably connected to the channel section for selectively pivoting said wing section side portions and for selectively moving at least said lower portion of the channel wing section, and air flow means operably connected to at least one of said fuselage means and laterally placed wing member and channel wing section for creating a flow of air over said wing member and wing section.

12. The construction defined in claim 11 in which the air flow means has at least a part thereof mounted for angled movement with the channel wing section.

13. The construction defined in claim 11 in which the laterally placed wing member has a forward edge; in which the means pivotally mounting the channel wing section on the laterally placed wing member mounts said wing section spaced aft of said wing member forward edge and includes hinge means; in which the hinge means connects said lower power of said channel wing section to the laterally placed wing member for movement of the channel wing section forward edge away from the laterally placed wing member as the laterally placed wing section is angled downwardly in reference to said wing member forming an open slot forward of the channel wing section and aft of a portion of the laterally placed wing member.

14. Aerodynamic device construction including fuselage means, a generally laterally placed wing member operably connected to the fuselage means, said laterally placed wing member having an airfoil section, said airfoil section having a lower surface, a generally U-shaped channel wing section mounted on the laterally placed wing member, said channel wing section having a forward edge and an inner opening formed therein opening upwardly, the channel wing section having generally vertically extending side portions mounted stationary on the laterally placed wing member and a normally generally horizontally extending lower portion pivotally connected to the laterally placed wing member, means pivotally mounting the channel wing section lower portion on the laterally placed wing member, the opening in the channel wing section at the location of the channel wing section forward edge normally being free of opening below the laterally placed wing airfoil section lower surface, said means also mounting the channel wing section lower portion for selective pivotal movement to a position in which said lower portion is angled downwardly in reference to the laterally placed wing member, control means operably connected to the channel wing section lower portion for selectively moving said lower portion, and air flow means operably connected to at least one of said fuselage means and laterally placed wing member and channel wing section for creating a flow of air over said wing member and wing section.

15. The construction defined in claim 14 in which at least a part of the air flow means is mounted for movement with the channel wing section lower portion; in which the laterally placed wing member has a forward edge; in which the means pivotally mounting the channel wing section lower portion on the laterally placed wing member mounts said wing section spaced aft of said wing member forward edge and includes hinge means; and in which the hinge means connects said lower portion of the channel wing section to the laterally placed wing member for movement of the lower portion forward edge away from the laterally placed wing member as the lower portion is angled downwardly in reference to said wing member forming an open slot forward of the lower portion and aft of a portion of the laterally placed wing member.

16. The construction defined in claim 14 in which the channel wing section side portions extend downwardly adjacent the channel wing section lower portion and below said lower portion when said lower portion is in its normal generally horizontally extending position so that a part of said side portions are always adjacent said lower portion despite an angled position of said lower portion.

References Cited in the file of this patent

UNITED STATES PATENTS

| | | |
|---|---|---|
| 2,397,526 | Bonbright | Apr. 2, 1946 |
| 2,437,684 | Custer | Mar. 16, 1948 |
| 2,589,732 | Riviere | Mar. 18, 1952 |
| 2,594,766 | Goddard | Apr. 29, 1952 |
| 2,611,556 | Custer | Sept. 23, 1952 |
| 2,687,262 | Custer | Aug. 24, 1954 |
| 2,693,920 | Taylor | Nov. 9, 1954 |